(12) United States Patent
Son et al.

(10) Patent No.: US 8,054,770 B2
(45) Date of Patent: Nov. 8, 2011

(54) SYSTEM AND METHOD FOR PERFORMING PERIODIC RANGING IN SLEEP MODE IN A COMMUNICATION SYSTEM

(75) Inventors: Yeong-Moon Son, Anyang-si (KR); Kyeong-Tae Do, Suwon-si (KR); Sung-Wook Park, Beongnam-si (KR); Jae-Jeong Shim, Seongnam-si (KR); Jung-Je Son, Seongnam-si (KR); Hyoung-Kyu Lim, Seoul (KR); Sung-Jin Lee, Seoul (KR); Hyun-Jeong Kang, Seoul (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 937 days.

(21) Appl. No.: 11/773,179

(22) Filed: Jul. 3, 2007

(65) Prior Publication Data

US 2008/0123576 A1 May 29, 2008

(30) Foreign Application Priority Data

Jul. 3, 2006 (KR) .................. 10-2006-0062230
Jul. 14, 2006 (KR) .................. 10-2006-0066600

(51) Int. Cl.
*G08C 17/00* (2006.01)
(52) U.S. Cl. .................. 370/311; 370/310; 370/329
(58) Field of Classification Search ........... 370/310–350
See application file for complete search history.

(56) References Cited

U.S. PATENT DOCUMENTS

| 2005/0058058 | A1 | 3/2005 | Cho et al. |
| 2005/0060358 | A1 | 3/2005 | Kim |
| 2009/0291717 | A1* | 11/2009 | Lee et al. ............ 455/574 |

FOREIGN PATENT DOCUMENTS

| EP | 1 571 866 | 9/2005 |
| EP | 1 594 233 | 11/2005 |
| EP | 1 628 438 | 2/2006 |
| KR | 1020060013984 | 2/2006 |
| WO | WO 2005/060358 | 7/2005 |
| WO | WO 2006/016765 | 2/2006 |
| WO | WO 2006/036047 | 4/2006 |

OTHER PUBLICATIONS

Son et al: "Sleep Mode Supporting the Periodic Ranging With Compressed Format of SLP ID Fields in MOB TRF-IND Message-Harmonization AD-HOC Consensus Contribution", Internet Citation, Aug. 17, 2004.
Son et al: "Periodic Ranging in Sleep Mode", Internet Citation, Mar. 5, 2004.

* cited by examiner

*Primary Examiner* — Wayne Cai
(74) *Attorney, Agent, or Firm* — The Farrell Law Firm, P.C.

(57) ABSTRACT

A system and method for periodic ranging in sleep mode in a communication system are provided, in which an MS is allocated an uplink burst from a BS and transmits a first message in the allocated uplink burst to the BS, the first message indicating that the MS is alive during sleep mode.

10 Claims, 8 Drawing Sheets

SYSTEM AND METHOD FOR PERFORMING PERIODIC RANGING IN SLEEP MODE IN A COMMUNICATION SYSTEM

PRIORITY

This application claims priority under 35 U.S.C. §119(a) to a Korean Patent Application filed in the Korean Intellectual Property Office on Jul. 3, 2006 and assigned Serial No. 2006-62230 and a Korean Patent Application filed in the Korean Intellectual Property Office on Jul. 14, 2006 and assigned Serial No. 2006-66600, the contents of both of which are incorporated herein by reference.

BACKGROUND OF THE INVENTION

1. Field of the Invention

The present invention relates to a system and method for performing periodic ranging in sleep mode in a communication system.

2. Description of the Related Art

In general, future-generation communication systems are being developed to provide high-speed large-data transmission/reception service to Mobile Stations (MSs). A major example of such systems is Institute of Electrical and Electronics Engineers (IEEE) 802.16e.

FIG. 1 illustrates the configuration of a conventional IEEE 802.16e communication system.

Referring to FIG. 1, the IEEE 802.16e communication system is configured in a multi-cell structure, including cells 100 and 150, a Base Station (BS) 110 covering the cell 100, a BS 140 covering the cell 150, and a plurality of MSs 111, 113, 130, 151 and 153.

As the IEEE 802.16e communication system supports Mobile Station(MS)'s mobility, the power consumption of the MS is a significant factor that affects overall system performance. To minimize the MS's power consumption, a sleep mode and an awake mode operation between an MS and a BS have been proposed. The MS periodically compensates for timing and frequency offsets, and transmits power with respect to the BS in order to handle changes in the channel status between the MS and the BS. This operation is called ranging, and it includes initial, periodic and bandwidth request ranging. In light of the support of the MS's mobility, periodic ranging is rendered more significant.

FIG. 2 illustrates a periodic ranging operation in sleep mode in the conventional IEEE 802.16e communication system.

Referring to FIG. 2, an MS 250 transmits a SLeeP-REQuest (SLP-REQ) message to a BS 200 to transition from awake mode to sleep mode in step 201. The BS 200 determines whether to approve the awake-to-sleep mode transition, considering its status and the status of the MS 250 and transmits a SLeeP-ReSPonse (SLP-RSP) message corresponding to the determination result to the MS 250 in step 203. The SLP-RSP message contains a Next Periodic Ranging parameter. Upon receipt of the SLP-RSP message, the MS 250 detects the Next Periodic Ranging parameter, based upon which it prepares for periodic ranging. The Next Periodic Ranging Parameter is an offset indicating when the MS 250 is to wake up from the sleep mode in order to be allocated an uplink burst for periodic ranging from the BS 200. The offset is assumed to be a frame offset herein. In a frame indicated by the Next Periodic Ranging parameter, counted from the frame carrying the SLP-RSP message in a sleep interval, the MS 250 transitions from the sleep mode to the awake mode to perform the periodic ranging. If the MS 250 is already in the awake mode, it only has to perform the periodic ranging in the frame. If the sleep interval still lasts after the periodic ranging, the MS 250 may return to the sleep mode.

Meanwhile, the MS 250 performs the sleep mode operation, while increasing the sleep interval by an algorithm. If the MS 250 is in the sleep mode in the frame designated for periodic ranging by the Next Periodic Ranging parameter, it transitions to the awake mode in step 205 in which it performs the periodic ranging in step 207.

The periodic ranging is performed through at least one exchange of a RaNGing REQuest (RNG-REQ) message and a RaNGing ReSPonse (RNG-RSP) message in steps 211 to 225. When the MS 250 gets the uplink burst for the periodic ranging corresponding to the Next Periodic Ranging parameter from the BS 200 in step 205, it transmits an RNG-REQ message to the BS 200 in the allocated uplink burst in step 211. The BS 200 transmits ranging response information with frequency, time, and transmit power to be compensated for to the MS 250 by an RNG-RSP message in step 213. If the frequency, time and transmit power need to be additionally compensated for, Ranging Status is set to 1 indicating Continue.

Upon receipt of the RNG-RSP message with Ranging Status set to 1, the MS 250 detects parameters necessary for compensating for the frequency, time and transmit power from the received message and performs the compensation. In step 215, the MS 250 transmits an RNG-REQ message to the BS 200 in order to continue the on-going frequency, time and transmit power compensation.

Upon receipt of the RNG-REQ message, the BS 200 performs the periodic ranging by repeating the RNG-REQ/RNG-RSP exchange in steps 217, 219, 221 and 223. If it determines that no further frequency, time and transmit power compensation is needed, the BS 200 transmits to the MS 250 an RNG-RSP message with Ranging Status set to 3 indicating Success and a Next Periodic Ranging parameter indicating a frame for the next periodic ranging in step 225.

Upon receipt of the RNG-RSP message with Ranging Status set to 3 and the Next Periodic Ranging parameter, the MS 250 prepares for the Next Periodic Ranging in the frame indicated by the Next Periodic Ranging parameter, considering that the periodic ranging has been completed. If a sleep interval still lasts after the periodic ranging is completed, the MS 250 may return to the sleep mode.

When the MS 250 is in the sleep mode in the frame indicated by the Next Periodic Ranging, it transitions to the awake mode and performs the periodic ranging. When the MS 250 is in the awake mode in the frame indicated by the Next Periodic Ranging, it just performs the periodic ranging in the awake mode. To be more specific, when the MS 250 is in the awake mode at the start of periodic ranging, it naturally decodes a DownLink-MAP (DL-MAP) message or an UpLink-MAP (UL-MAP) message to monitor the presence or absence of a data burst allocated to the MS 250 in a downlink frame. If the BS 200 has given a periodic ranging opportunity to the MS 250, that is, the BS 200 has allocated an uplink burst to the MS 250, the MS 250 is aware of the periodic ranging opportunity.

On the other hand, if the MS 250 is in the sleep mode at the start of the periodic ranging, it transitions to the awake mode and decodes the DL-MAP or UL-MAP message to monitor the presence or absence of a data burst allocated to the MS 250 in the downlink frame.

As described above, the Next Periodic Ranging parameter applies irrespective of whether the MS 250 is in the sleep mode or the awake mode until just before or at the start of periodic ranging. This is described as a "Don't care about sleep and normal operation" in step 227. That is, it can be said that the sleep-mode periodic ranging operation is performed considering both the sleep mode and the periodic ranging, while ensuring maximal compatibility with the conventional IEEE 802.16e communication system.

While not described specifically in relation to step 227, it is to be noted that the MS 250 should re-calculate a frame in which to transition to the awake mode according to the latest Next Periodic Ranging parameter received in an SLP-RSP or RNG-RSP message. For example, the MS 250 transitions to the awake mode and then returns to the sleep mode by receiving an SLP-RSP message during step 227. Thus the MS 250 determines when to transition to the awake mode using a Next Periodic Ranging parameter included in the SLP-RSP message.

FIG. 3 illustrates a signal flow for the periodic ranging operation in the sleep mode between the MS and the BS in the conventional IEEE 802.16e communication system.

Referring to FIG. 3, to transition from the awake mode to the sleep mode, an MS 300 transmits an SLP-REQ message to a BS 350 in step 311. The BS 350 determines whether to approve the awake-to-sleep mode transition according to its status and the status of the MS 300 and transmits an SLP-RSP message according to the determination result to the MS 300 in step 313. The SLP-RSP message contains a Next Periodic Ranging parameter. Upon receipt of the SLP-RSP message, the MS 300 starts a sleep mode operation according to the SLP-RSP message in step 315. The MS 300 is also aware of when to perform periodic ranging from the Next Periodic Ranging parameter.

During the sleep mode operation, the MS 300 transitions to the awake mode in a frame indicated by the Next Periodic Ranging parameter, for periodic ranging in step 317. In step 323, the MS 300 detects a periodic ranging opportunity, i.e. an uplink burst allocated to the MS 300 from a UL-MAP message broadcast by the BS 350. The MS 300 transmits an RNG-REQ message to the BS 350 in the uplink burst in step 325.

The BS 350 transmits information needed for compensating for frequency, time and transmit power to the MS 300 by an RNG-RSP message in step 327. If the BS 350 determines that the compensation is required for the MS 300, it transmits an RNG-RSP message with Ranging Status set to 1 to the MS 300.

Upon receipt of the RNG-RSP message with Ranging Status set to 1, the MS 300 transmits another RNG-REQ message to the BS 350, considering that the periodic ranging is still going on in step 329. RNG-REQ/RNG-RSP exchanges take place in steps 331 and 333 in the same manner as in steps 325 and 327, so their detailed description is not provided herein.

If the BS 350 determines that no further frequency, time and transmit power compensation is needed for the MS 300 during the periodic ranging, that is, the periodic ranging is to be completed, it transmits an RNG-RSP message with Ranging Status set to 3 and a Next Periodic Ranging parameter to the MS 300 in step 335.

Upon receipt of the RNG-RSP message, the MS 300 is aware that the periodic ranging 321 has been completed. If the MS 300 is still in a sleep interval, it transitions to the awake mode in step 337.

In the mean time, the MS 300 transitions to the awake mode in a frame indicated by the Next Periodic Ranging parameter set in the RNG-RSP message in step 339. As described earlier, if the MS 300 is in the awake mode, it just performs periodic ranging in the frame indicated by the Next Periodic Ranging parameter. After steps 339 to 343, the periodic ranging is performed in the above-described manner and thus will not be repeated.

As described above with reference to FIGS. 2 and 3, the periodic ranging proposed for the conventional IEEE 802.16e communication system is viable only when both the MS and the BS are normal. In other words, if either of the MS and the BS is in an abnormal state, the periodic ranging is impossible.

Accordingly, there exists a need for a novel periodic ranging scheme that considers when either of the MS and the BS is placed in an abnormal state.

SUMMARY OF THE INVENTION

An aspect of the present invention is to address at least the problems and/or disadvantages and to provide at least the advantages described below. Accordingly, an aspect of the present invention is to provide a system and method for performing periodic ranging in sleep mode in a communication system.

Moreover, an aspect of the present invention provides a system and method for performing periodic ranging in sleep mode when either of a BS and an MS is abnormal in a communication system.

In accordance with the present invention, there is provided a ranging method of an MS in a communication system, in which an uplink burst is allocated from a BS and a first message is transmitted in the allocated uplink burst to the BS, the first message indicating that the MS is alive during sleep mode.

In accordance with the present invention, there is provided a ranging method of a BS in a communication system, in which an uplink burst required for ranging is allocated to an MS and it is determined that the MS is alive during sleep mode, if the BS receives a ranging request message from the MS after the uplink burst allocation.

In accordance with the present invention, there is provided a method for performing periodic ranging in sleep mode in an MS in a communication system, in which the sleep mode is transitioned to an awake mode to perform the periodic ranging with a BS, it is determined whether the periodic ranging fails in the awake mode, and it is determined that communication with the BS is in an abnormal state, if the periodic ranging fails.

In accordance with the present invention, there is provided a method for performing periodic ranging with a sleep-mode MS in a BS in a communication system, in which it is determined whether periodic ranging with the MS fails, at a time set for periodic ranging, and it is determined that communication with the MS is in an abnormal state, if the periodic ranging fails.

In accordance with the present invention, there is provided a system for performing ranging in a communication system, in which an MS is allocated an uplink burst from a BS and transmits a first message in the allocated uplink burst to the BS, the first message indicating that the MS is alive during sleep mode.

In accordance with the present invention, there is provided a system for performing ranging in a communication system, in which a BS allocates an uplink burst required for ranging to an MS and determines that the MS is alive during sleep mode, if the BS receives a ranging request message from the MS after the uplink burst allocation.

In accordance with the present invention, there is provided a system for performing periodic ranging in sleep mode in a communication system, in which an MS transitions from the sleep mode to awake mode to perform the periodic ranging with a BS, determines whether the periodic ranging fails in the awake mode, and determines that communication with the BS is in an abnormal state, if the periodic ranging fails.

In accordance with the present invention, there is provided a system for performing periodic ranging with a sleep-mode MS in a communication system, in which a BS determines whether periodic ranging with the MS fails, at a time set for periodic ranging, and determines that communication with the MS is in an abnormal state, if the periodic ranging fails.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

Figure 1:
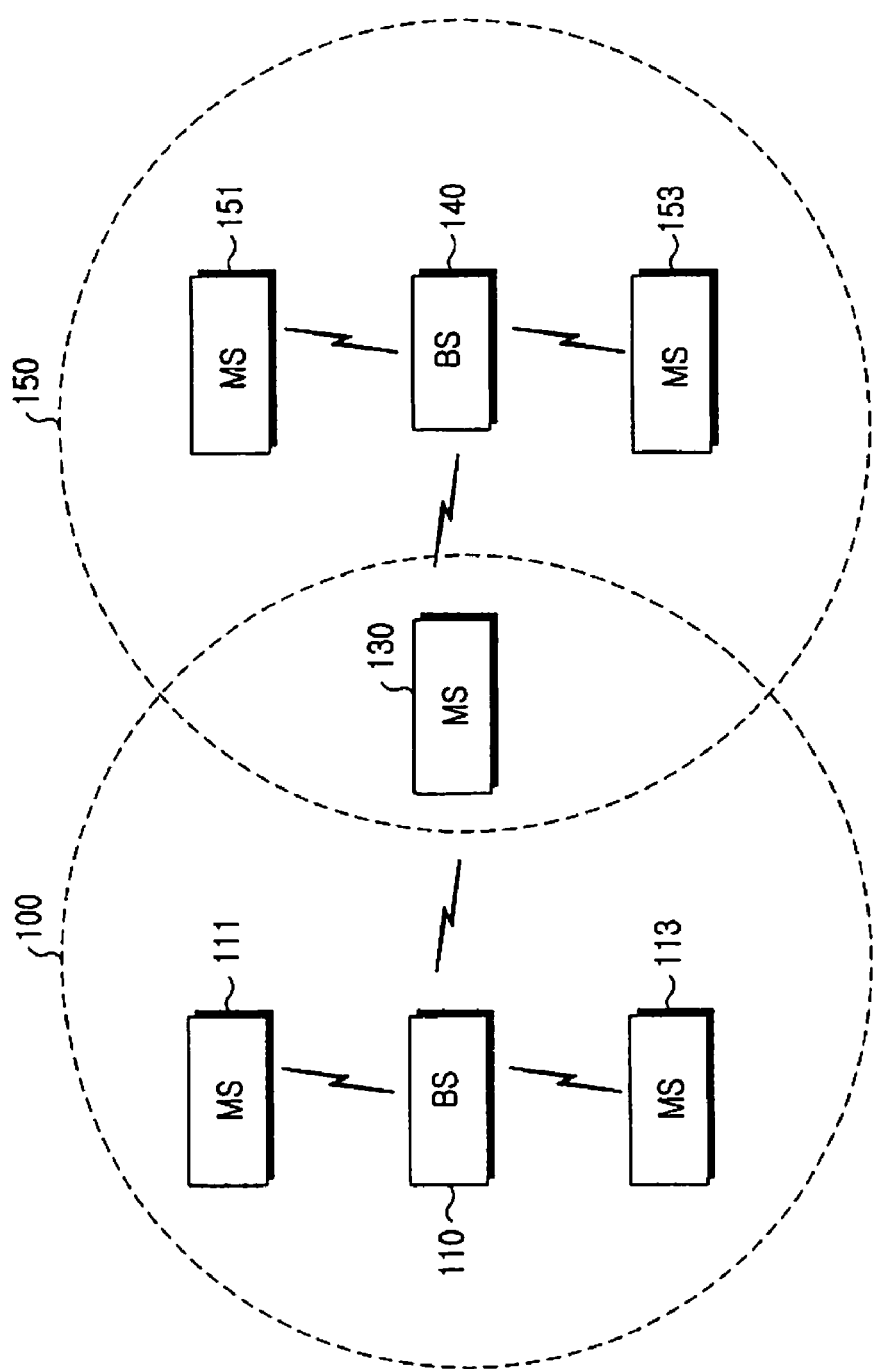
FIG. 1 illustrates the configuration of a conventional IEEE 802.16e communication system.
Figure 2:
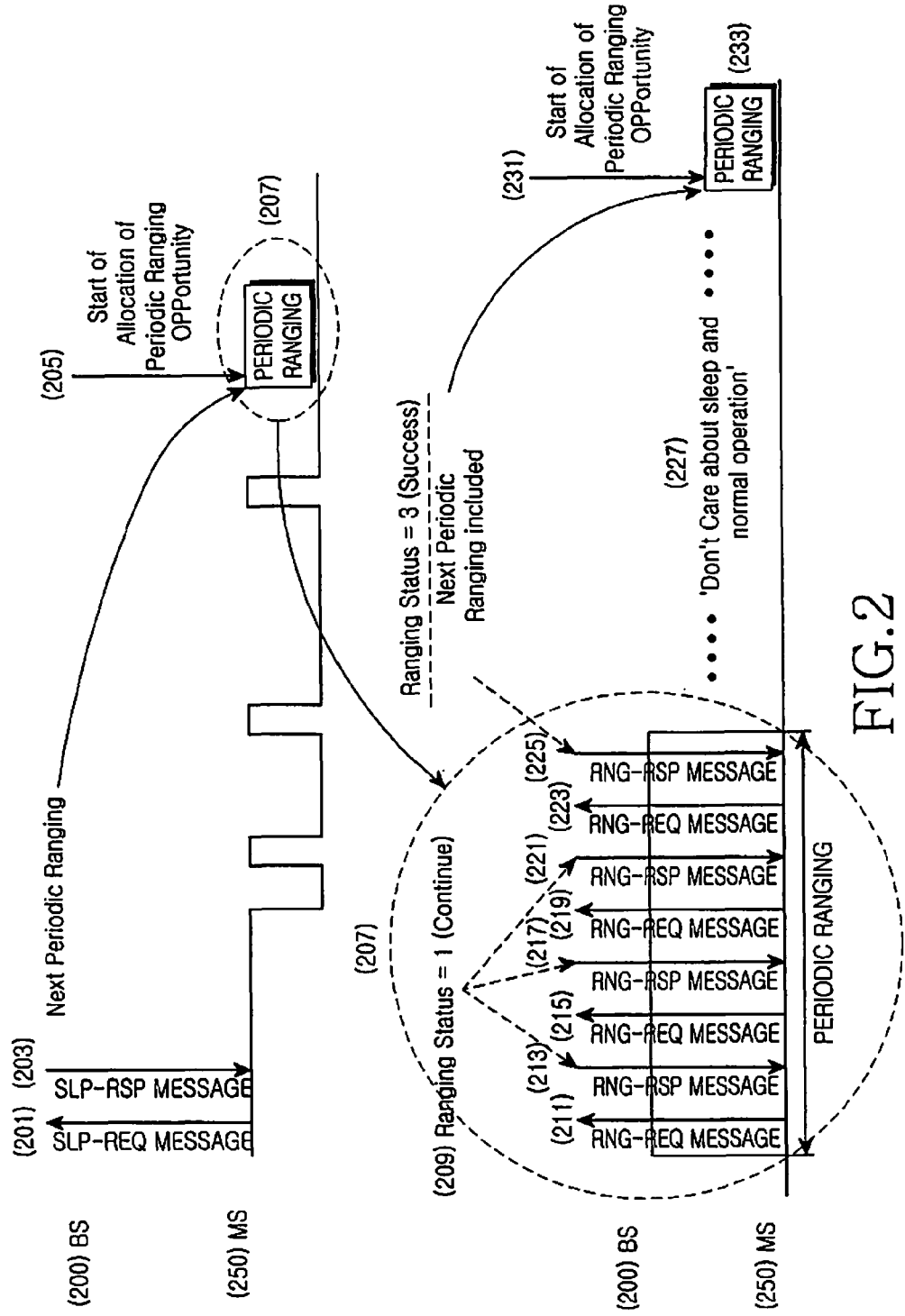
FIG. 2 illustrates a periodic ranging operation in sleep mode in the conventional IEEE 802.16e communication system.
Figure 3:
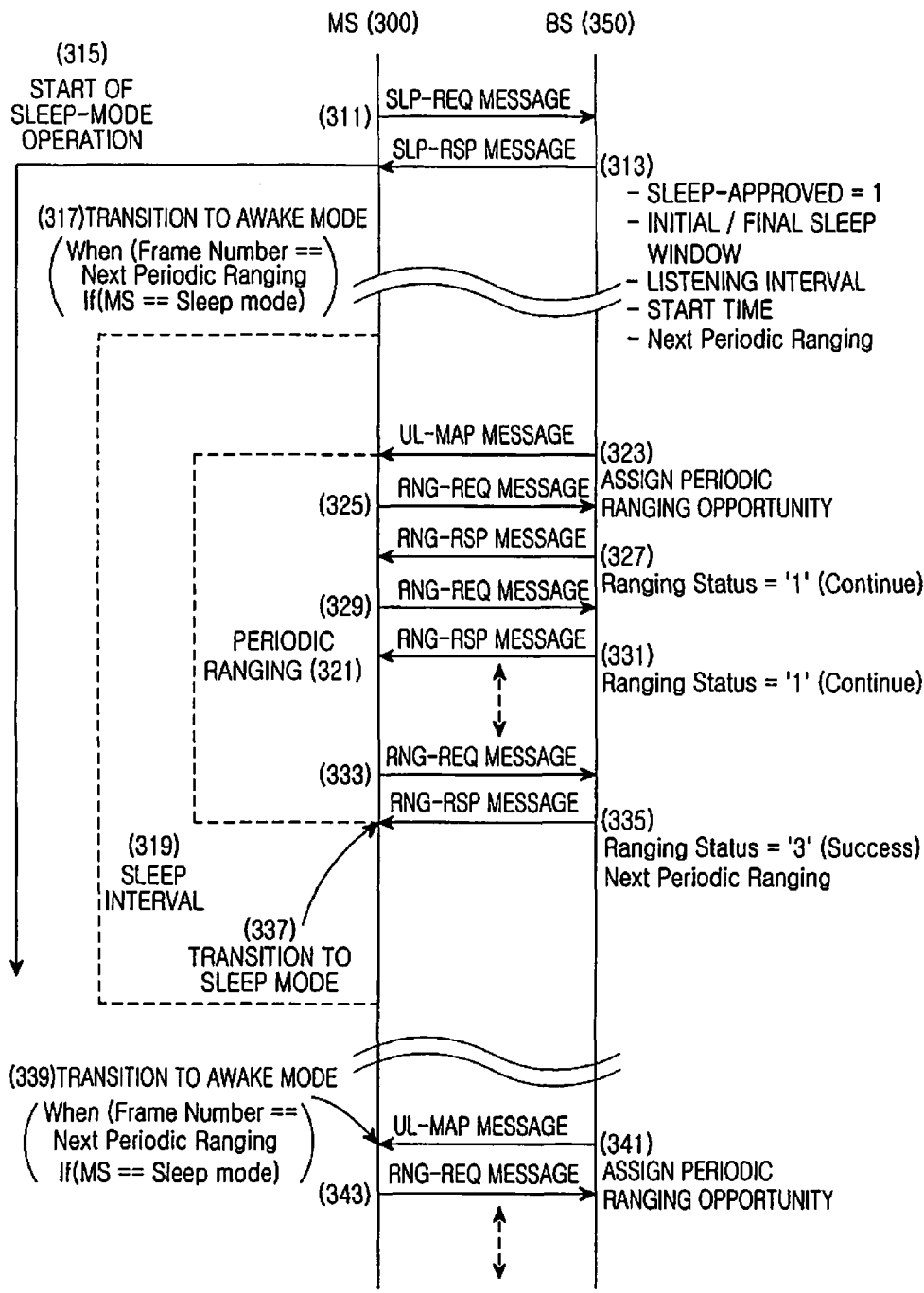
FIG. 3 illustrates a signal flow for the periodic ranging operation in the sleep mode between an MS and a BS in the conventional IEEE 802.16e communication system.

The matters defined in the description such as a detailed construction and elements are provided to assist in a comprehensive understanding of preferred embodiments of the present invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness. Throughout the drawings, the same drawing reference numerals will be understood to refer to the same elements, features and structures.

The present invention provides a system and method for performing periodic ranging in sleep mode in a communication system, for example, an Institute of Electrical and Electronics Engineers (IEEE) 802.16e communication system. Also, the present invention provides a system and method for enabling periodic ranging in sleep mode even when either of a BS and an MS is in an abnormal state in an IEEE 802.16e communication system. While the sleep-mode periodic ranging system and method of the present invention will be described in the context of the IEEE 802.16e communication system, it is a mere preferred application. Thus it is to be clearly understood that the sleep-mode periodic ranging system and method of the present invention are applicable to other communication systems.

Terms used herein are defined as follows.

(1) Timer Activation—indicates that a timer starts counting. When the timer is activated, the next periodic ranging starts.

(2) Timer Deactivation—indicates that the timer ends its operation. A time deactivation time is a time by which the periodic ranging is successful or aborted, or a timer expiration time. The periodic ranging success implies that a BS has transmitted an RNG-RSP message with Ranging Status set to 3 or an MS has received an RNG-RSP message with Ranging Status set to 3. The periodic ranging abortion implies that the BS has transmitted an RNG-RSP message with Ranging Status set to 2 or the MS has received an RNG-RSP message with Ranging Status set to 2. That is, Ranging Status is set to one of the following values listed in Table 1 below.

TABLE 1

| Value of Ranging Status | Meaning |
| --- | --- |
| 1 | Continue |
| 2 | Abort |
| 3 | Success |
| 4 | Re-Range |

(3) Timer Reset—indicates that the timer is reset during its operation when a predetermined condition is satisfied. The timer reset condition will be described later in detail.

In the conventional IEEE 802.16e communication system, when a BS allocates a periodic ranging opportunity, i.e. an uplink burst to an MS in sleep mode, it usually notifies the MS of the periodic ranging opportunity. However, the BS simply transmits information about the periodic ranging opportunity to the MS with no regard to an operation for the next periodic ranging.

If periodic ranging is performed normally between the sleep-mode MS and the BS, there is no problem. However, if the MS is not aware of the uplink burst allocation for periodic ranging or if the BS fails to receive an RNG-REQ message in the allocated uplink burst from the MS, the sleep-mode periodic ranging is not performed normally. It may also occur that even though the MS is aware of the presence of the allocated uplink burst, it does not transmit an RNG-REQ message to the BS due to some problem in the MS itself. Also, in view of some problem in the BS, the BS may not allocate the uplink burst for periodic ranging to the MS.

As described above, the states that impede a normal periodic ranging between the BS and the MS are defined as abnormal states. When either of the BS and the MS is placed in an abnormal state, the periodic ranging cannot be performed normally in the sleep mode. As a consequence, the sleep-mode MS cannot acquire accurate synchronization to the BS.

Accordingly, the present invention provides a system and method for monitoring occurrence of an abnormal state during sleep-mode periodic ranging and enabling the periodic ranging despite the abnormal state in the IEEE 802.16e communication system. In addition, to support the periodic ranging considering the abnormal state, the following timers are defined.

(1) Timer$_{\_BS\_PR(Periodic\ Ranging)\_error}$: A BS-managed timer activated when the BS starts periodic ranging with the sleep-mode MS. That is, the Timer$_{\_BS\_PR\_error}$ is used when the BS fails to receive an RNG-REQ message from the MS despite allocation of an uplink burst to the MS for periodic ranging. The Timer$_{\_BS\_PR\_error}$ is activated at a time, for example, in a frame calculated using a Next Periodic Ranging Type, Length, Value (TLV), and counts a predetermined time period. Upon receipt of an RNG-REQ message from the MS in the allocated uplink burst, the Timer$_{\_BS\_PR\_error}$ is reset. When the periodic ranging is successful or aborted, that is, the BS transmits an RNG-RSP message with Ranging Status set to 3 or 2, the Timer$_{\_BS\_PR\_error}$ is deactivated. The RNG-RSP message with Ranging Status set to 2 indicating Abort is transmitted to de-register the MS from the BS, which is beyond the scope of the present invention and thus will not be described in detail herein.

When the MS receives the RNG-RSP message with Ranging Status set to 3 indicating Success, it determines that the periodic ranging is completed successfully and calculates a frame in which the next periodic ranging will start, referring to a Next Periodic Ranging TLV included in the RNG-RSP message. If the MS remains in a current sleep interval, it returns to the sleep mode. The MS operates conventionally after the sleep mode transition.

Expiration of the $Timer_{BS\_PR\_error}$ indicates that the BS has not received the RNG-REQ message from the MS despite the allocation of the uplink burst to the MS. The BS then deactivates the $Timer_{BS\_PR\_error}$ and determines the MS as placed in a de-registration state, considering that further communication with the MS is impossible. In light of the de-registration state of the MS, the BS can delete all stored information about the MS or keep the MS information for a period of time. The BS carries out no more scheduling for providing a service to the MS.

(2) $Timer_{MS\_PR(Periodic\ Ranging)\_error}$: An MS-managed timer activated when the sleep-mode MS starts periodic ranging with the BS at the predetermined time. The $Timer_{MS\_PR\_error}$ is used when failing to get an uplink burst for periodic ranging allocated from the BS or failing to receive an RNG-RSP message from the BS. The $Timer_{MS\_PR\_error}$ is activated in a frame calculated using a Next Periodic Ranging TLV and counts a predetermined time period. The MS stays in the awake mode until the $Timer_{MS\_PR\_error}$ expires, awaiting reception of an RNG-RSP message and monitoring allocation of an uplink burst for periodic ranging. The $Timer_{MS\_PR\_error}$ is reset when the uplink burst is allocated to the MS. When the periodic ranging is successful or aborted in the sleep mode, that is, the BS receives an RNG-RSP message with Ranging Status set to 3 or 2 from the BS, the $Timer_{MS\_PR\_error}$ is deactivated. Upon receipt of the RNG-RSP message with Ranging Status set to 2, it scans another BS or performs network reentry to the BS, which is beyond the scope of the present invention and will not be described in detail Expiration of the $Timer_{MS\_PR\_error}$ indicates that the BS has not allocated the uplink burst to the MS or the MS fails to receive an RNG-RSP message from the BS for such a reason as poor channel status. The MS then deactivates the $Timer_{MS\_PR\_error}$, considering that further communication with the BS is impossible, and scans another BS, performs a handover to another BS, or performs network reentry to the BS.

Figure 4:
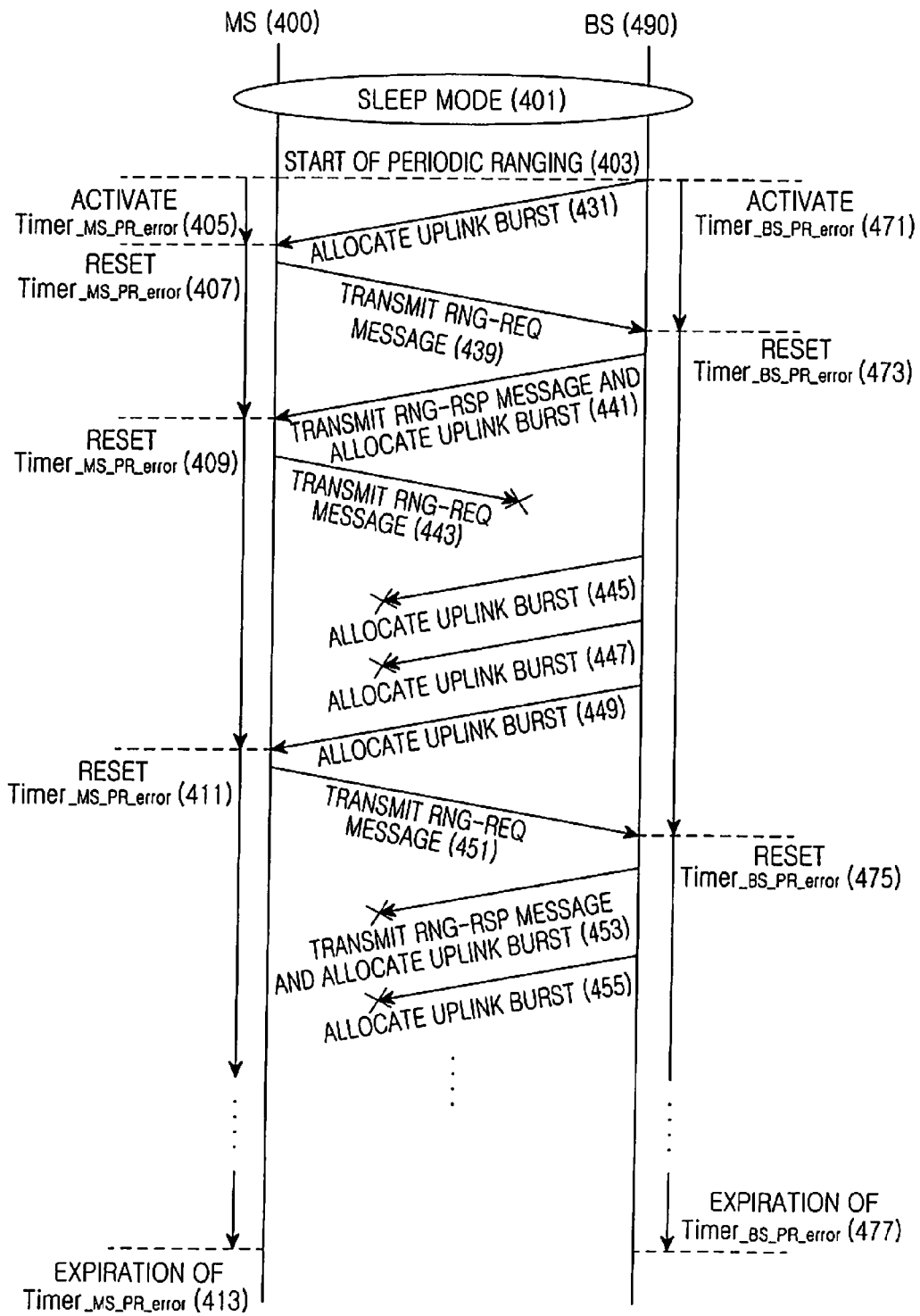
FIG. 4 illustrates a signal flow for a periodic ranging operation in sleep mode, considering an abnormal state in which either of an MS and a BS is placed in an IEEE 802.16e communication system according to the present invention.

FIG. 4 illustrates a signal flow for a periodic ranging operation in sleep mode, considering an abnormal state in which either an MS or a BS is placed in the IEEE 802.16e communication system according to the present invention.

Referring to FIG. 4, an MS 400 operates in sleep mode and transitions to awake mode in a frame 403 calculated using a Next Periodic Ranging TLV in step 401. Simultaneously, the MS 400 activates the $Timer_{MS\_PR\_error}$ in step 405. A BS 490 also activates the $Timer_{BS\_PR\_error}$ in the frame 403 in step 471. As previously stated, the $Timer_{MS\_PR\_error}$ and the $Timer_{BS\_PR\_error}$ count predetermined time periods. In step 431, the BS 490 allocates an uplink burst for periodic ranging to the MS 400. Upon detection of the uplink burst allocation, the MS resets the $Timer_{MS\_PR\_error}$ in step 407.

In step 439, the MS transmits an RNG-REQ message to the BS 490 in the allocated uplink burst. Upon receipt of the RNG-REQ message, the BS 490 determines that the MS 400 has transitioned to the awake mode because of the RNG-REQ reception and resets the $Timer_{BS\_PR\_error}$ in step 473. If the BS 490 determines that the periodic ranging needs to continue, i.e. additional frequency, time and transmit power compensation is required for the MS 400, it transmits an RNG-RSP message with Ranging Status set to Continue to the MS 400 and allocates an uplink burst to the MS 400 to support an additional RNG-REQ transmission from the MS in step 441.

Upon receipt of the RNG-RSP message, the MS 400 determines from Ranging Status set to Continue that the periodic ranging continues, detects the uplink burst allocation for the additional RNG-REQ transmission, and resets the $Timer_{MS\_PR\_error}$ in step 409. In step 443, the MS 400 transmits an RNG-REQ message to the BS 490 in the allocated uplink burst.

If the BS 490 is placed in an abnormal state due to poor channel status or any other factor, that is, the BS 490 fails to receive the RNG-REQ message, it considers that a temporary problem has occurred to communication with the MS 400. That is, the BS 490 determines that the communication between the MS 400 and the BS 490 is in an abnormal state. Since the $Timer_{BS\_PR\_error}$ is still running, the BS 490 allocates an uplink burst for periodic ranging, i.e. RNG-REQ transmission to the MS 400 in step 445. The BS 490 may transmit an RNG-RSP message simultaneously with the uplink burst allocation. A condition for transmitting the RNG-RSP message along with the uplink burst allocation is beyond the scope of the present invention and its detailed description is not provided herein.

Meanwhile, the BS 490 awaits reception of an RNG-REQ message from the MS 400 after the uplink burst allocation. It may occur that the BS 490 fails to receive the RNG-REQ message transmitted in the allocated uplink burst by the MS 400 or the MS 400 fails to be aware of the allocated uplink burst.

While not shown in FIG. 4, although the MS 400 is aware of the allocated uplink burst, it may not transmit the RNG-REQ message to the BS 490 due to some problem in the MS 400. In addition, the BS 490 may not allocate the uplink burst to the MS 400 for some other reason than the afore-stated factors. In the mean time, the BS 490 allocates an uplink burst for another RNG-REQ transmission to the MS 400 because it has not received the RNG-REQ message in the allocated uplink burst from the MS 400 and the $Timer_{BS\_PR\_error}$ is still running in step 447. As with step 445, the BS 490 has not received the RNG-REQ message in the allocated uplink burst from the MS 400 and the $Timer_{BS\_PR\_error}$ is still running. Thus, the BS 490 allocates an uplink burst for further RNG-REQ transmission to the MS 400 in step 449.

However, if the temporary channel problem is solved, that is, the abnormal state is released and thus the MS 400 is aware of the allocated uplink burst, it resets the $Timer_{MS\_PR\_error}$ error in step 411 and transmits an RNG-REQ message to the BS 490 in step 451. Similarly, upon receipt of the RNG-REQ message from the MS 400, the BS 490 resets the $Timer_{BS\_PR\_error}$ in step 475. When the BS 490 determines an additional periodic ranging is required for the MS 400 based on the received RNG-REQ message, it allocates an uplink burst for RNG-REQ transmission to the MS 400 in step 453. As previously stated, the BS 490 may transmit an RNG-RSP message along with the uplink burst allocation.

In this manner, the BS 490 continues to transmit an RNG-RSP message or allocate an uplink burst until expiration of the $Timer_{BS\_PR\_error}$ in step 455. The MS 400 also awaits allocation of an uplink burst until before receiving an RNG-RSP message with Ranging Status set to Abort or Success. If the MS 400 is allocated an uplink burst from the BS 490, it resets the $Timer_{MS\_PR\_error}$. If the $Timer_{MS\_PR\_error}$ expires without the uplink burst allocation or without the reception of the RNG-RSP message with Ranging Status set to Abort or Success in step 413, the MS 400 performs cell selection to another BS or network reentry to the BS 490, considering that some problem has occurred to communications with the BS 490.

Similarly, if the BS 490 has not received an RNG-REQ message from the MS 400 until the expiration of the Timer$_{\_BS\_PR\_error}$ despite the continuous uplink burst allocation in step 477, the BS 490 deactivates the Timer$_{\_BS\_PR\_error}$ and determines the MS 490 as placed in a de-registration state, considering that some problem has occurred to communications with the MS 400. That is, the BS 490 performs no further scheduling to provide a service to the MS 400.

Figure 5A:
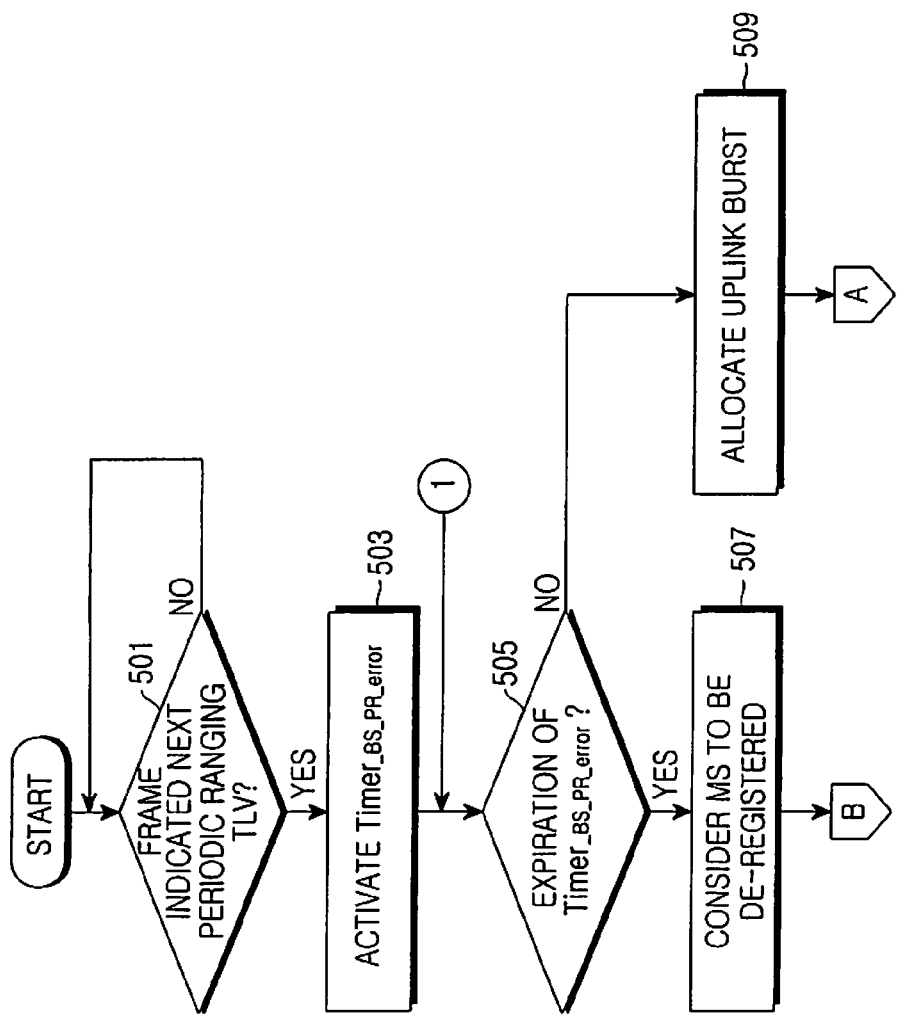
FIGS. 5A and 5B illustrate the operation of the BS illustrated in FIG. 4.
Figure 5B:
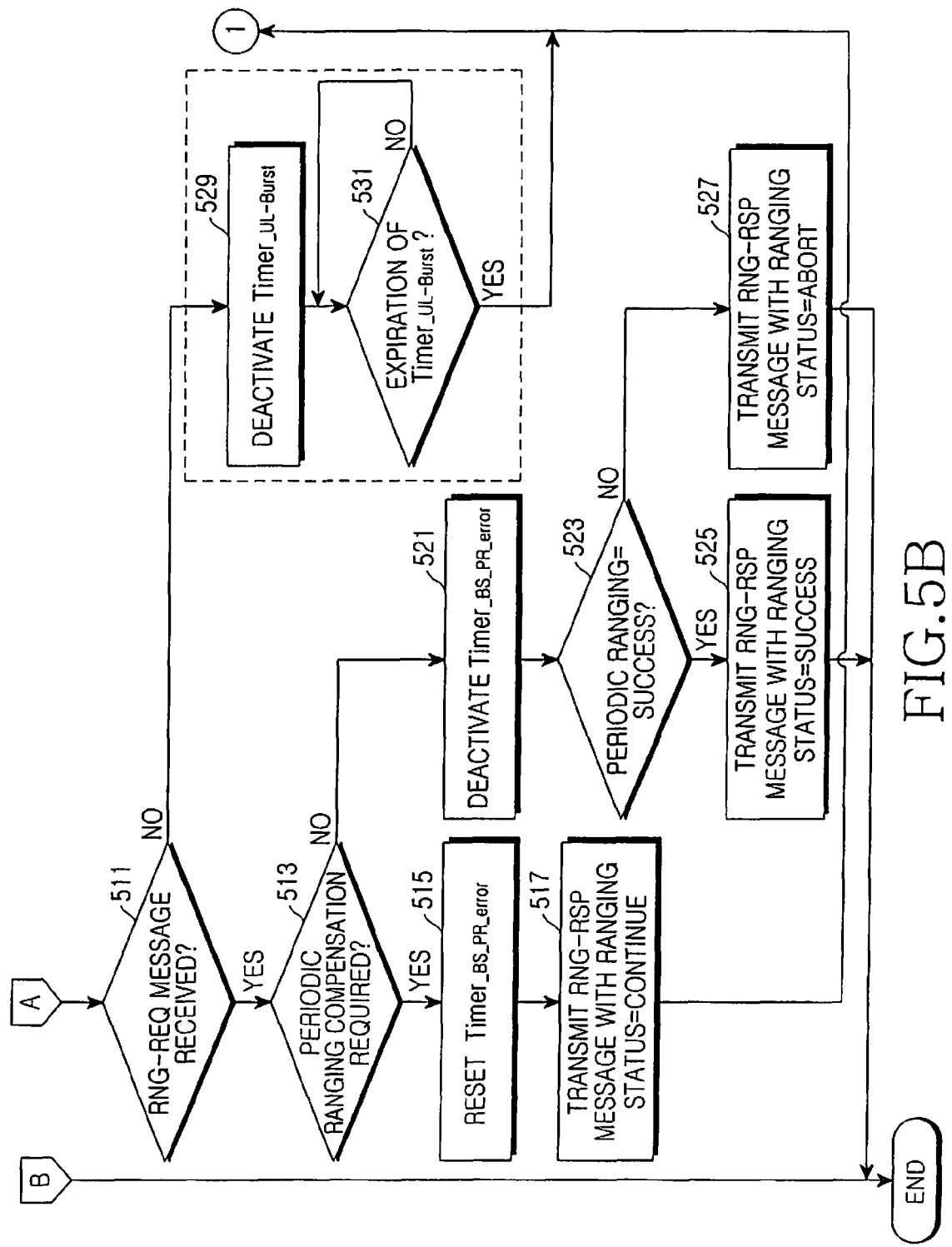

FIGS. 5A and 5B illustrate the operation of the BS 490 illustrated in FIG. 4.

Referring to FIGS. 5A and 5B, the BS 490 determines whether a current frame is indicated by a Next Periodic Ranging TLV in which periodic ranging will start for the MS 400 operating in the sleep mode in step 501. If the current frame is indicated by the Next Periodic Ranging TLV, the BS 490 activates the Timer$_{\_BS\_PR\_error}$ in step 503 and monitors whether the Timer$_{\_BS\_PR\_error}$ has expired in step 505. Upon expiration of the Timer$_{\_BS\_PR\_error}$, the BS deactivates it and considers the MS to be de-registered in step 507. Then the BS 490 ends the algorithm.

If the Timer$_{\_BS\_PR\_error}$ is still running in step 505, the BS 490 allocates an uplink burst for RNG-REQ transmission to the MS 400 in step 509 and monitors reception of an RNG-REQ message in the allocated uplink burst from the MS 400 in step 511.

Upon receipt of the RNG-REQ message, the BS 490 determines whether additional ranging compensation, i.e. additional time, frequency and transmit power compensation is required for the MS 400 in step 513. If the time, frequency and transmit power compensation is required, the BS 490 resets the Timer$_{\_BS\_PR\_error}$ in step 515 and transmits an RNG-RSP message with Ranging Status set to Continue to the MS 400 in order to notify that the additional ranging compensation is required in step 517 and then returns to step 505 in order to allocate an uplink burst for RNG-REQ transmission to the MS 400.

However, if the BS 490 has not received the RNG-REQ message from the MS 400 in step 511, it resets a Timer$_{\_UL\_Burst}$ in step 529. The Timer$_{\_UL\_Burst}$ counts a predetermined time period so that the BS 490 allocates an uplink burst after some time delay rather than immediately after detecting that the RNG-REQ message has not been received. The BS 490 then monitors expiration of the Timer$_{\_UL\_Burst}$ in step 531 and returns to step 505 when the timer expires. While steps 529 and 531 associated with the Timer$_{\_UL\_Burst}$ are depicted in FIG. 5, they may not be performed.

If the additional time, frequency and transmit power compensation is not required for the MS 400 in step 513, the BS 490 deactivates the Timer$_{\_BS\_PR\_error}$ in step 521. The additional ranging compensation is not needed when the period ranging is successful or the ranging compensation is impossible. Therefore, the BS 490 determines whether the periodic ranging is successful in step 523. If the periodic ranging is successful, the BS 490 transmits an RNG-RSP message with Ranging Status set to Success to the MS 400 in step 525 and then ends the algorithm. To indicate when to start the next periodic ranging, the BS 490 includes a Next Periodic Ranging TLV in the RNG-RSP message.

If the periodic ranging is aborted in step 523, the BS 490 transmits an RNG-RSP message with Ranging Status set to Abort to the MS 400, considering that the periodic ranging cannot be performed further due to an abnormal state in step 527. Then the BS 490 ends the algorithm.

Figure 6A:
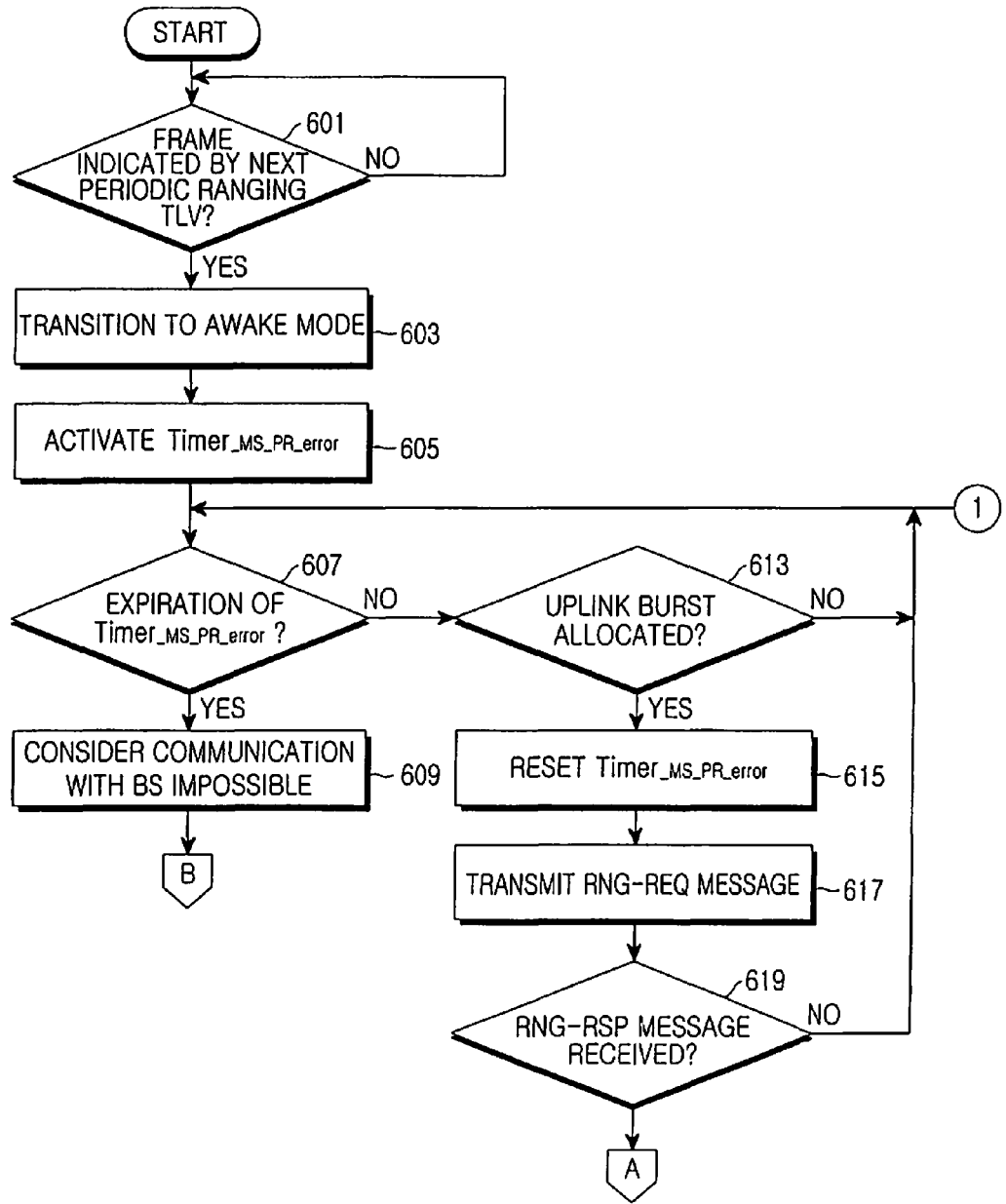
FIGS. 6A and 6B illustrate the operation of the MS illustrated in FIG. 4.
Figure 6B:
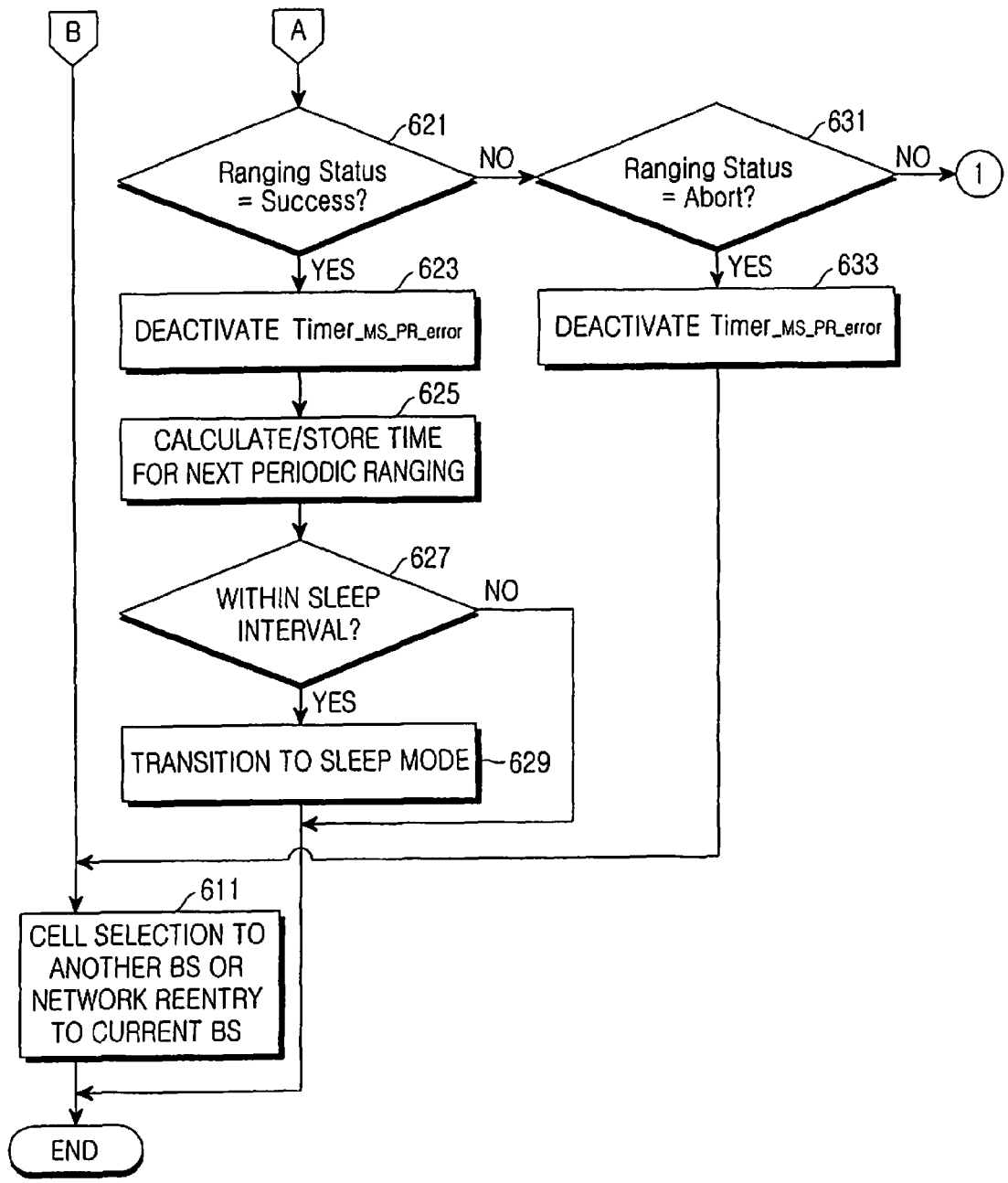

FIGS. 6A and 6B illustrate the operation of the MS 400 illustrated in FIG. 4.

Referring to FIGS. 6A and 6B, the MS 400 determines whether a current frame is for periodic ranging, indicated by a Next Periodic Ranging TLV during a sleep mode operation in step 601. If the current frame is indicated by the Next Periodic Ranging TLV, the MS 400 transitions to the awake mode in step 603 and activates the Timer$_{\_MS\_PR\_error}$ in step 605. In step 607, the MS determines whether the Timer$_{\_MS\_PR\_error}$ has expired. When the timer expires, the MS 400 deactivates the Timer$_{\_MS\_PR\_error}$, considering that communication with the BS 490 is impossible in step 609 and performs cell selection to another BS or network reentry to the BS 490 in step 611.

If the Timer$_{\_MS\_PR\_error}$ is still running in step 607, the MS 400 determines whether the BS 490 has allocated an uplink burst in the current frame to the MS 400 in step 613. If the uplink burst has been allocated, the MS 400 resets the Timer$_{\_MS\_PR\_error}$ in step 615, transmits an RNG-REQ message to the BS 490 in the allocated uplink burst in step 617, and monitors reception of an RNG-RSP message from the BS 490 in step 619. If the RNG-RSP message has not been received, the MS 400 returns to step 607.

Upon receipt of the RNG-RSP message in step 619, the MS 400 checks whether Ranging Status is set to Success in the message in step 621. If Ranging Status is Success, the MS 400 deactivates the Timer$_{\_MS\_PR\_error}$, considering that the periodic ranging is successful in step 623 and calculates and stores a frame in which it will start the next periodic ranging using a Next Periodic Ranging TLV included in the RNG-RSP message in step 625. In step 627, the MS 400 determines whether it remains in a sleep interval after the periodic ranging. If the MS 400 remains in the sleep interval, it returns to the sleep mode in step 629 and then ends the algorithm. If the MS 400 is outside the sleep interval in step 627, it performs the sleep mode operation in the conventional manner and ends the algorithm.

If Ranging Status is not Success in step 621, the MS 400 checks whether Ranging Status is Abort in step 631. If Ranging Status is Abort, the MS 400 deactivates the Timer$_{\_MS\_PR\_error}$ in step 633 and returns to step 611. If Ranging Status is not Abort in step 631, which implies that Ranging Status is set to Continue, the MS 400 returns to step 607.

A sleep-mode periodic ranging operation considering an abnormal state according to a second preferred embodiment of the present invention will be described below.

Compared to the first embodiment in which a periodic ranging is performed considering an abnormal state in the sleep mode by use of timers, when the MS is not allocated an uplink burst from the BS after transitioning to the awake mode in a frame indicated by a Next Periodic Ranging TLV, it immediately performs network reentry in the second embodiment of the present invention. The network reentry involves initial ranging.

In accordance with the second embodiment of the present invention, when the MS fails to receive an RNG-RSP message or receives an RNG-RSP message with Ranging Status set to Continue, for an RNG-REQ message transmitted in an uplink burst allocated by the BS, that is, when the MS is not allocated an uplink burst by the BS despite the requirement of additional ranging compensation, it also performs the network reentry.

Even though the BS fails to receive an RNG-REQ message from the MS in an allocated uplink burst of a frame indicated by a Next Periodic Ranging TLV, it may not allocate an additional uplink burst, considering that the MS may not perform network reentry if it determines not to. As in the conventional IEEE 802.16e communication system, the BS can periodically allocate an uplink burst by use of an internal timer.

In accordance with a third embodiment of the present invention, the BS does not allocate an uplink burst for periodic ranging of the MS. Instead, the MS transmits a Code Division Multiple Access (CDMA) code, i.e. a ranging code in a contention-based periodic ranging area. For this purpose, certain messages need to be modified.

(1) SLP-REQ—a message indicating that the MS transmits to the BS to request awake-to-sleep mode transition. This message contains a plurality of parameters i.e. Information Elements (IEs) necessary for the MS to operate in the sleep mode. The SLP-REQ message has the following configuration.

TABLE 2

| Syntax | Size (bits) | Notes |
|---|---|---|
| SLP-REQ_Message_Format( ) { | | |
| Management message type = 46 | 8 | |
| initial-sleep window | 6 | |
| final-sleep window | 10 | |
| listening interval | 6 | |
| reserved | 1 | |
| Method of Periodic Ranging Indication | 1 | |
| } | | |

Referring to Table 2, Management message type identifies the transmitted message. When Management message type is 46, it indicates the transmitted message is an SLP-REQ message. Initial-sleep window indicates a requested start value for a sleep interval measured in frames. Final-sleep window is a requested stop value for the sleep interval measured in frames. That is, the sleep interval can be updated within a range defined by the initial and final window values. Listening interval is a requested listening interval that can be measured in frames.

The SLP-REQ message further includes Method of Periodic Ranging in addition to the other IEs common to the conventional SLP-REQ message. Method of Periodic Ranging is a 1-bit IE indicating whether the MS will transmit a ranging code in a contention-based periodic ranging area, for periodic ranging. If Method of Periodic Ranging is set to a predetermined value, for example, '1', this implies that the sleep-mode MS transmits a ranging code in the contention-based periodic ranging area, for periodic ranging.

The use of Method of Periodic Ranging set to '1' simplifies the message-based periodic ranging in which the BS allocates an uplink burst to the MS and the MS transmits an RNG-REQ message in the allocated uplink burst as done in the typical IEEE 802.16e communication system and the first and second embodiments of the present invention, so that periodic ranging serves only the purpose of indicating whether the MS is kept alive, that is, the MS is not power-down but alive during sleep mode where the MS can receive any message from the BS.

In accordance with the third embodiment of the present invention, the BS does not continuously allocate uplink bursts for periodic ranging in a frame indicated by a Next Periodic Ranging TLV. Rather, when the BS receives an RNG-REQ message from the MS in an uplink burst that the BS has allocated to the MS, it considers that the MS is alive during sleep mode. Therefore, the BS just transmits an RNG-RSP message with Ranging Status set to Success to the MS without further periodic ranging, i.e. further ranging compensation. In this case, the RNG-RSP message includes a Next Periodic Ranging TLV to notify the MS of when to transition to the awake mode and start periodic ranging. As stated above, the periodic ranging is performed only to check whether the MS is alive during sleep mode. The MS performs an actual periodic ranging in the same sense of the periodic ranging in the first and second embodiments of the present invention, by use of a timer T4. The timer T4 counts a predetermined time period for the MS to perform the actual periodic ranging. For notational simplicity, the periodic ranging according to the third embodiment of the present invention is called "CDMA code-based periodic ranging".

Meanwhile, if Method of Periodic Ranging is set to a predetermined value such as '0', this implies that the BS continuously allocates an uplink burst for periodic ranging of the MS and the MS transmits an RNG-REQ message in the allocated uplink burst as done in the first and second embodiments of the present invention. In this case, periodic ranging serves the purpose of monitoring whether the MS is alive during sleep mode and performing a message-based periodic ranging, as well. In other words, if Method of Periodic Ranging is set to '0', both CDMA code-based periodic ranging and message-based periodic ranging can be performed.

(2) SLP-RSP—a response message for the SLP-REQ message. The SLP-RSP message can be used to indicate whether MS-requested transition to the sleep mode is approved, or to indicate an unsolicited instruction. The SLP-RSP message includes IEs necessary for the MS to operate in the sleep mode and has the following format illustrated in Table 3 below.

TABLE 3

| Syntax | Size (bits) | Notes |
|---|---|---|
| SLP-RSP_Message_Format( ) { | | |
| Management message type=47 | 8 | |
| Sleep-approved | 1 | 0: Sleep-mode request denied<br>1: Sleep-mode request approved |
| if (Sleep-approved==0) { | | |
| After-REQ-action | 1 | 0: the MSS may retransmit the MOB_SLPREQ message after the time duration (REQ-duration) given by the BS in this message<br>1: the MSS shall not retransmit the MOB_SLPREQ message and shall await the MOB_SLPRSP message from the BS |
| REQ-duration | 4 | Time duration for case where After-REQ-action value is 0 |
| reserved | 2 | |
| } | | |
| Else { | | |
| Start frame | | |
| initial-sleep window | 6 | |
| final-sleep window | 10 | |
| listening interval | 6 | |
| SLPID | 10 | |
| Next Periodic Ranging | 24 | Offset of the frame |
| Method of Periodic Ranging | | |
| } | | |
| } | | |

Referring to Table 3, Management message type identifies the transmitted message. When Management message type is 47, it indicates the transmitted message is an SLP-RSP message. Sleep-approved is a 1-bit IE. If Sleep-approved is set to a predetermined value such as '0', it indicates that a sleep-mode request is denied and if Sleep-approved is set to another predetermined value, such as '1', it indicates that the sleep-mode request is approved. When Sleep-approved is 0, the MS for which the sleep-mode request is denied transmits an SLP-REQ message to the BS or awaits reception of an SLP-RSP message indicating an unsolicited instruction from the BS according to a predetermined rule. If Sleep-approved is 1, the SLP-RSP message includes Start frame, initial-sleep window, final-sleep window, listening interval and SLPID. If Sleep-approved is 0, the SLP-RSP message includes After-REQ-action and REQ-duration.

Start frame indicates the number of frames until the MS enters the first sleep interval, not including the frame in which the SLP-RSP message has been received. Thus, the MS transitions to the sleep mode after the number of frames indicated by Start frame, counted starting from the next frame to the frame carrying the SLP-RSP message. SLPID identifies a sleep-mode MS. For example, SLPID can distinguish a total of 1024 sleep-mode MSs.

As previously described, initial-sleep window indicates a start value for a sleep interval measured in frames. Final-sleep window is a value for the sleep interval measured in frames. Listening interval is a listening interval measured in frames. After-REQ-action indicates an action that the MS is to take when the sleep-mode request is denied.

Method of Periodic Ranging has the same meaning as described with reference to Table 2. When the BS transmits an SLP-RSP message in an unsolicited manner, it does not know whether the MS prefers a message-based or a CDMA code-based periodic ranging and thus the MS has to notify the BS of its preference beforehand. The SLP-RSP message transmitted in the unsolicited manner is referred to as 'unsolicited SLP-RSP message'. For the MS to notify the BS of its preferred periodic ranging scheme, the following TLV in Table 4 is defined.

TABLE 4

| Type | Length | Value | Scope |
| --- | --- | --- | --- |
| xx | 1 | Method of Periodic Ranging<br>0: Message-based Periodic Ranging<br>1: CDMA code-based Periodic Ranging | REG-REQ |

When the MS transmits a REGistration REQuest (REG-REQ) message with the TLV illustrated in Table 4 to the BS, the BS sets Method of Periodic Ranging referring to the TLV when transmitting an unsolicited SLP-RSP message. That is, the BS selects the message-based periodic ranging or the CDMA code-based periodic ranging for the MS based on the TLV illustrated in Table 4. The parameters listed in Table 2 and Table 3 can also be represented in the form of TLVs as done in Table 4.

When Method of Periodic Ranging is set to '1', periodic ranging is performed as follows.

Method of Periodic Ranging set to 1 indicates that the MS will perform a CDMA code-based periodic ranging. Therefore, the BS does not need to operate for periodic ranging with the MS. The BS does not have to continuously allocate an uplink burst for the MS to perform periodic ranging. However, to monitor whether the MS is alive during sleep mode, the BS activates the Timer$_{BS\_PR\_error}$ in a frame indicated by a Next Periodic Ranging TLV and awaits reception of an RNG-REQ message from the MS as done in the first and second embodiments of the present invention. Upon receipt of an initial RNG-REQ message in an already-allocated uplink burst, the BS confirms that the MS is alive during sleep mode and deactivates the Timer$_{BS\_PR\_error}$ because no further periodic ranging is required. Then, the BS transmits an RNG-RSP message with Ranging Status set to Success to the MS. The RNG-RSP message also includes a Next Periodic Ranging TLV indicating when the MS is to transition to the awake mode for the next periodic ranging. Even though Method of Periodic Ranging is set to '1' as in the third embodiment of the present invention, the BS awaits reception of the RNG-REQ message using the Timer$_{BS\_PR\_error}$ for when the BS fails to receive the RNG-REQ message from the MS, as in the first and second embodiments of the present invention. Since the MS performs the CDMA code-based periodic ranging in the third embodiment of the present invention, once the BS determines whether the MS is alive during sleep mode, it unconditionally transmits an RNG-RSP message with Ranging Status set to Success and a Next Periodic Ranging TLV to the MS in order to force termination of a message-based periodic ranging. Other timer-related operations between the MS and the BS are done in the same manner as in the first and second embodiments of the present invention.

When Method of Periodic Ranging is set to '0', periodic ranging is performed as follows.

Method of Periodic Ranging set to 0 indicates that the MS will perform a message-based periodic ranging. Thus, the MS performs a periodic ranging either defined for the conventional IEEE 802.16e communication system or proposed to prevent the BS or the MS from being placed in an abnormal state according to the first and second embodiments of the present invention. Meanwhile, if TLV encoding is not included, the operation defined for when the Method of Periodic Ranging is set to 0 is performed or a CDMA code-based periodic ranging is performed.

As described above, the present invention advantageously enables sleep-mode periodic ranging considering an abnormal state in which an MS or a BS is placed in a communication system supporting a sleep mode operation and an awake mode operation simultaneously with periodic ranging, such as an IEEE 802.16e communication system. Therefore, the periodic ranging is rendered reliable, thereby increasing overall system performance.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A ranging method of a Mobile Station (MS) in a communication system, comprising:

receiving information on an uplink burst allocated for a periodic ranging from a Base Station (BS);

transmitting a first message on the uplink burst to the BS, the first message indicating that the MS is alive during sleep mode;

receiving a ranging response message from the BS after transmitting the first message;

activating a timer when receiving the information on the uplink burst;

deactivating the timer when receiving the ranging response message having a ranging status indicating one of a success and an abort of the periodic ranging or when the timer expires; and determining that a communication with the BS is abnormal when the timer is deactivated.

2. The ranging method of claim 1, wherein the first message is a ranging request message.

3. The ranging method of claim 1, wherein the ranging response message includes a first parameter indicating a next ranging time.

4. A ranging method of a Base Station (BS) in a communication system, comprising:
   allocating an uplink burst required for ranging to a Mobile Station (MS);
   determining that the MS is alive during sleep mode, if the BS receives a ranging request message from the MS after allocating the uplink burst;
   transmitting a ranging response message to the MS after receiving the ranging request message;
   activating a timer simultaneously with allocating the uplink burst;
   deactivating the timer when transmitting the ranging response message having a ranging status indicating one of a success and an abort of a periodic ranging or when the timer expires; and
   determining that a communication with the MS is abnormal when the timer is deactivated.

5. The ranging method of claim 4, wherein the ranging response message includes a first parameter indicating a next ranging time.

6. A system for performing ranging in a communication system, comprising:
   a Mobile Station (MS) for receiving information on an uplink burst allocated for a periodic ranging from a Base Station (BS), transmitting a first message on the uplink burst to the BS, the first message indicating that the MS is alive during sleep mode, receiving a ranging response message from the BS after transmitting the first message, activating a timer when receiving the information on the uplink burst, deactivating the timer when receiving the ranging response message having a ranging status indicating one of a success and an abort of the periodic ranging or when the timer expires, and determining that a communication with the BS is abnormal when the timer is deactivated.

7. The system of claim 6, wherein the first message is a ranging request message.

8. The system of claim 6, wherein the ranging response message includes a first parameter indicating a next ranging time.

9. A system for performing ranging in a communication system, comprising:
   a Base Station (BS) for allocating an uplink burst required for ranging to a Mobile Station (MS), determining that the MS is alive during sleep mode, if the BS receives a ranging request message from the MS after allocating the uplink burst, transmitting a ranging response message to the MS after receiving the ranging request message, activating a timer simultaneously with allocating the uplink burst, deactivating the timer when transmitting the ranging response message having a ranging status indicating one of a success and an abort of a periodic ranging or when the timer expires, and determining that a communication with the MS is abnormal when the timer is deactivated.

10. The system of claim 9, wherein the ranging response message includes a first parameter indicating a next ranging time.

* * * * *